(12) United States Patent
Bland et al.

(10) Patent No.: US 10,562,206 B2
(45) Date of Patent: Feb. 18, 2020

(54) CEMENTITIOUS PANELS, AND SYSTEMS AND METHODS FOR MANUFACTURING CEMENTITIOUS PANELS

(71) Applicant: National Gypsum Properties, LLC, Charlotte, NC (US)

(72) Inventors: Brian Bland, Matthews, NC (US); Brian G. Randall, Charlotte, NC (US)

(73) Assignee: National Gypsum Properties, LLC, Charlotte, NC (US)

( * ) Notice: Subject to any disclaimer, the term of this patent is extended or adjusted under 35 U.S.C. 154(b) by 48 days.

(21) Appl. No.: 15/995,798

(22) Filed: Jun. 1, 2018

(65) Prior Publication Data
US 2018/0345534 A1 Dec. 6, 2018

Related U.S. Application Data

(60) Provisional application No. 62/515,253, filed on Jun. 5, 2017.

(51) Int. Cl.
*B32B 3/00* (2006.01)
*B28B 19/00* (2006.01)
(Continued)

(52) U.S. Cl.
CPC .......... *B28B 19/0092* (2013.01); *B28B 5/027* (2013.01); *B28B 11/24* (2013.01); *B32B 3/04* (2013.01); *B32B 7/14* (2013.01); *B32B 13/08* (2013.01); *B32B 13/14* (2013.01); *B32B 37/1207* (2013.01); *B32B 37/1284* (2013.01); *B32B 37/1292* (2013.01); *B32B 37/24* (2013.01); *B32B 38/0004* (2013.01); *B32B 39/00* (2013.01); *B32B 2037/1253* (2013.01); *B32B 2037/243* (2013.01);
(Continued)

(58) Field of Classification Search
CPC ..... B28B 19/0092; B28B 5/027; B28B 11/24; B32B 7/12; B32B 3/04; B32B 13/08; B32B 37/12; B32B 37/1207; B32B 37/1253; B32B 37/1292
See application file for complete search history.

(56) References Cited

U.S. PATENT DOCUMENTS 4,948,647 A * 8/1990 Burkard .................. B32B 13/14
428/70
5,879,446 A 3/1999 Patel et al.
(Continued)

*Primary Examiner* — Elizabeth E Mulvaney
(74) *Attorney, Agent, or Firm* — Dority & Manning, P.A.

(57) ABSTRACT

The present disclosure embraces cementitious panels, and systems and methods of manufacturing cementitious panels. An exemplary cementitious panel includes a cementitious core material, a plurality of sheets of facing material surrounding the cementitious core material, and a radiation-cured adhesive. An exemplary method of manufacturing a cementitious panel includes conveying a slurry of cementitious core material and a plurality of sheets of facing material, applying a radiation-curable adhesive to at least one of the sheets of facing material, forming a continuous length of cementitious panel material, at least partly curing the radiation-curable adhesive with one or more beams of radiation emitting from one or more radiation-emitting devices, and cutting the continuous length of cementitious panel material laterally to a desired length, providing a cementitious panel.

23 Claims, 6 Drawing Sheets

(51) Int. Cl.
  *B32B 13/08* (2006.01)
  *B32B 13/14* (2006.01)
  *B32B 3/04* (2006.01)
  *B32B 37/24* (2006.01)
  *B32B 7/14* (2006.01)
  *B32B 37/12* (2006.01)
  *B28B 5/02* (2006.01)
  *B28B 11/24* (2006.01)
  *B32B 39/00* (2006.01)
  *B32B 38/00* (2006.01)
  *E04C 2/04* (2006.01)

(52) U.S. Cl.
  CPC ... *B32B 2250/40* (2013.01); *B32B 2262/0215* (2013.01); *B32B 2262/101* (2013.01); *B32B 2305/77* (2013.01); *B32B 2310/0825* (2013.01); *B32B 2310/0831* (2013.01); *B32B 2607/00* (2013.01); *E04C 2/043* (2013.01)

(56) References Cited

U.S. PATENT DOCUMENTS

| | | |
|---|---|---|
| 6,699,426 B1 | 3/2004 | Burke |
| 7,172,403 B2 | 2/2007 | Burke |
| 7,300,515 B2 | 11/2007 | Porter |
| 7,553,780 B2* | 6/2009 | Smith ............ B32B 13/14 442/131 |
| 8,137,490 B2* | 3/2012 | Frank ............ B28B 5/027 156/39 |
| 2001/0000738 A1 | 5/2001 | Mathieu |
| 2003/0089061 A1* | 5/2003 | DeFord ............ E04C 2/04 52/309.9 |
| 2003/0211305 A1* | 11/2003 | Koval ............ B28B 19/0092 428/292.4 |
| 2004/0038065 A1* | 2/2004 | Francis ............ B32B 13/04 428/537.7 |
| 2004/0170873 A1 | 9/2004 | Smith |
| 2004/0266303 A1 | 12/2004 | Jaffee |
| 2004/0266304 A1 | 12/2004 | Jaffee |
| 2009/0186549 A1 | 7/2009 | Bennett |
| 2009/0223618 A1* | 9/2009 | Smith ............ B32B 13/14 156/45 |
| 2009/0297865 A1 | 12/2009 | Hauber et al. |
| 2014/0302280 A1* | 10/2014 | Gautam ............ C04B 20/1022 428/141 |
| 2015/0076728 A1 | 3/2015 | Mathieu |
| 2015/0076730 A1 | 3/2015 | Mathieu et al. |
| 2017/0030078 A1 | 2/2017 | Mathieu |
| 2017/0246838 A1* | 8/2017 | Rohlf ............ C04B 28/14 |

* cited by examiner

CEMENTITIOUS PANELS, AND SYSTEMS AND METHODS FOR MANUFACTURING CEMENTITIOUS PANELS

CROSS REFERENCE TO RELATED APPLICATION

This application claims priority from U.S. Provisional Application Ser. No. 62/515,253, filed Jun. 5, 2017, the entirety of which is hereby incorporated herein by reference.

BACKGROUND

Cementitious panels generally comprise a cementitious core material that contains a hydraulically setting material such as gypsum, cement, or the like, surrounded by a plurality of sheets of facing material such as paper or paperboard, or woven or non-woven fibers or filaments. The panels are typically manufactured using a continuous process, in which a slurry of cementitious core material is sandwiched between a lower and upper sheet of facing material. Typically the slurry of cementitious core material is applied on to a continuously advancing lower sheet of facing material, and a continuously advancing upper sheet of facing material is applied over the cementitious core material. The edges of the upper and lower sheets of facing material are adhered together using an adhesive. For example, the lower sheet of facing material may have long edges, which may be folded over the top of the gypsum slurry, with the long edges of the lower sheet underlapping the upper sheet of facing material. This process is sometimes referred to as "edge sealing" because the longitudinal edges or sides of the panel are, in a sense, "sealed" by the facing material. The slurry of cementitious core material and the sheets of facing material pass between parallel upper and lower forming plates or rolls, which shape a continuous length of cementitious panel material into a desired thickness and width. The panels are dried in an oven or kiln to evaporate excess (free) water. The dried panels may be further cut to desired sizes and bundled together for transfer to a warehouse or for shipping.

Certain materials can cause problems associated with adhering the sheets of facing material together, for example, in an edge sealing process. On the one hand, it may be desirable to utilize a relatively porous facing material, yet on the other hand, a porous facing material may allow adhesives to bleed through and onto the surface of the facing material. Adhesive on the surface of the facing material may come into contact with and accumulate on manufacturing equipment such as the forming plates or rolls, cutting equipment, conveyor belts or rollers, transfer table and lifting and lowering mechanisms, and the like. The buildup of adhesives on the manufacturing equipment can cause problems in operation of the equipment, and can increase process downtime required for cleanup and equipment maintenance. Additionally, adhesives that buildup on the manufacturing equipment can redeposit on the cementitious panels causing defects in panel quality.

Thus, it would be desirable to provide improved cementitious panels and improved systems and methods of manufacturing cementitious panels, for example, that minimize bleed through and accumulation of adhesives on the manufacturing equipment and redisposition of adhesives on the cementitious panels. The present disclosure addresses these needs by, among other things, providing cementitious panels that include a radiation-curable adhesive to adhere sheets of facing material to one another and by providing systems and methods for manufacturing such cementitious panels that include radiation-emitting devices to cure such radiation-curable adhesive.

BRIEF DESCRIPTION

Aspects and advantages will be set forth in part in the following description, or may be obvious from the description, or may be learned through practicing the presently disclosed subject matter.

In one aspect, the present disclosure embraces cementitious panels. An exemplary cementitious panel includes a cementitious core material, a plurality of sheets of facing material surrounding the cementitious core material, and a radiation-cured adhesive. The plurality of sheets of facing material may include a first sheet of facing material and a second sheet of facing material. The radiation-cured adhesive is applied to the first sheet of facing material and/or to the second sheet of facing material so as to adhere the first sheet of facing material to the second sheet of facing material.

In another aspect, the present disclosure embraces methods of manufacturing cementitious panels. An exemplary method of manufacturing cementitious panels includes conveying a slurry of cementitious core material and a plurality of sheets of facing material, and applying a radiation-curable adhesive to at least one of the sheets of facing material. The plurality of sheets of facing material may include a first sheet of facing material and a second sheet of facing material. The radiation-curable adhesive may be applied to the first sheet of facing material and/or to the second sheet of facing material. The exemplary method may further include forming a continuous length of cementitious panel material. The continuous length of cementitious panel material may include the slurry of cementitious core material surrounded by the plurality of sheets of facing material. The exemplary method may further include at least partly curing the radiation-curable adhesive with one or more beams of radiation emitting from one or more radiation-emitting devices, so as to adhere the first sheet of facing material to the second sheet of facing material. The exemplary method may further include cutting the continuous length of cementitious panel material laterally to a desired length, providing a cementitious panel. These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended Figures, in which.

Figure 1:
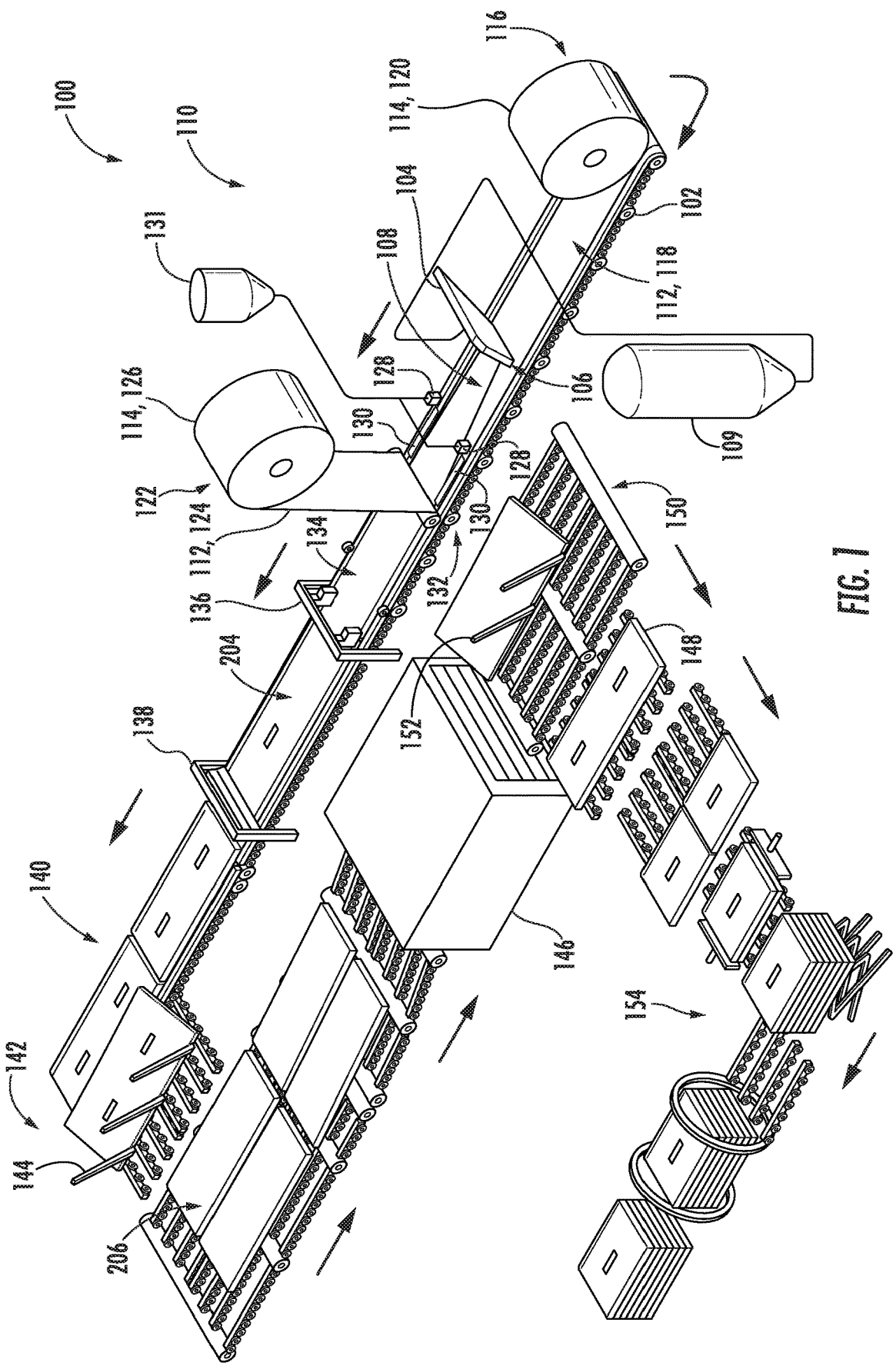
FIG. 1 schematically shows an exemplary system for manufacturing a cementitious panel.

Repeat use of reference characters in the present specification and drawings is intended to represent the same or analogous features or elements of the present disclosure.

DETAILED DESCRIPTION OF PARTICULAR EMBODIMENTS

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

The present disclosure generally provides cementitious panels that include a radiation-curable adhesive to adhere a plurality of sheets of facing material to one another and systems and methods for manufacturing such cementitious panels that include radiation-emitting devices to cure such radiation-curable adhesive. Exemplary cementitious panels include a cementitious core material and a plurality of sheets of facing material which together surround the cementitious core material. The plurality of sheets of facing material define a first broad face, a second broad face, a first longitudinal side, and a second longitudinal side of the cementitious panel. The plurality of sheets of facing material include a first sheet of facing material and a second sheet of facing material. A radiation-curable adhesive may be applied to the first sheet of facing material and/or to the second sheet of facing material so as to adhere the first sheet of facing material to the second sheet of facing material.

Exemplary methods of manufacturing a cementitious panel include conveying a slurry of cementitious core material and a plurality of sheets of facing material including a first sheet of facing material and a second sheet of facing material with a conveyor assembly, applying a radiation-curable adhesive to the first sheet of facing material and/or to the second sheet of facing material with one or more adhesive applicators, forming a continuous length of cementitious panel material with a forming assembly. The continuous length of cementitious panel material is made up of the slurry of cementitious core material surrounded by the plurality of sheets of facing material, and includes a first broad face, a second broad face, a first longitudinal side, and a second longitudinal side. Exemplary methods continue with at least partly curing the radiation-curable adhesive with one or more beams of radiation emitting from one or more radiation-emitting devices, so as to adhere the first sheet of facing material to the second sheet of facing material and cutting the continuous length of cementitious panel material laterally to a desired length with a cutting device, providing a cementitious panel.

In exemplary methods, forming the continuous length of cementitious panel material includes wrapping with a longitudinal side wrapping assembly, the first sheet of facing material from the first broad face and onto the second broad face, and/or wrapping the first sheet of facing material from the first broad face and onto the second broad face. Such wrapping with the longitudinal side wrapping assembly thereby defines the first longitudinal side of the cementitious panel material and/or the second longitudinal side of the cementitious panel material. Forming the continuous length of cementitious panel material additionally includes passing the continuous length of cementitious panel material between a pair of parallel plates or rollers separated from one another by a distance selected to define the thickness of the continuous length of cementitious panel material. The second sheet of facing material may extend along the second broad face of the cementitious panel, with the first sheet of facing material overlapping or underlapping the second sheet of facing material on the second broad face.

The cementitious panels presently disclosed include construction materials commonly referred to as wallboard, drywall, gypsum board, cement board, backer board, fiber cement siding, roof board, and the like. These materials may be used for interior or exterior construction. Interior uses includes finishing interior walls and ceilings, and providing backing material for flooring such as tile, stone and the like. Exterior uses includes exterior siding and roofing, and providing backing material for other exterior siding or roofing materials such as stucco, masonry, shingles, and the like. Additionally, cementitious panels may provide fire resistance and sound control.

The core material of a cementitious panel may include any hydraulically setting material, such as gypsum, synthetic gypsum, various cement types including but not limited to Portland cements (e.g., Portland blast-furnace slag cement or blast furnace cement, Portland-fly ash cement, Portland pozzolan cement, Portland silica fume cement, masonry cements, expansive cements), non-hydraulic cements, pozzolan-lime cements, slag-lime cements, supersulfated cements, calcium sulfoaluminate cements, "natural" cements, geopolymer cements, polymer cements, and blends thereof. The core material may be formulated by preparing a slurry that includes water, one or more of such hydraulically setting materials, and other additives such as setting accelerants, antidesicants, waterproofing agents, dispersants, set retarders, surfactants, strength enhancers, and reinforcing materials such as organic or inorganic aggregates, glass fibers, and the like.

Typically cementitious panels commonly referred to as wallboard, drywall, gypsum board, and the like are formed from a cementitious core material that primarily contains gypsum. Gypsum commonly refers to a mineral composed primarily of calcium sulfate dihydrate, which has the chemical formula $CaSO_4.2H_2O$. Gypsum may be obtained from naturally occurring calcium sulfate in anhydrous, dihydrate, or hemi-hydrate state. Alternatively, gypsum may be obtained synthetically, from industrial pollution scrubbers using a flue-gas desulfurization process. A slurry of gypsum to be used as a core material for a cementitious panel may be formed by mixing water with powdered anhydrous calcium sulfate $(CaSO_4)$ or calcium sulfate hemi-hydrate $(CaSO_4.\frac{1}{2}H_2O)$, commonly referred to as calcined gypsum, stucco, or plaster of Paris. Calcined gypsum is typically prepared by heating pulverized uncalcined gypsum rock in a mill such as a rotary kiln, hammer mill, impact mill, and others or simultaneously heating and pulverizing uncalcined gypsum in a mill to yield calcium sulfate dihydrate and water vapor. Calcined gypsum has the desirable property of being chemically reactive with water and will "set" rather quickly when the two are mixed together, yielding calcium sulfite hemi-hydrate.

Typically cementitious panels commonly referred to as cement board, backer board, fiber cement siding, and the like are formed from a cementitious core material that primarily contains Portland cement and organic or inorganic aggregate. Portland cement commonly refers to a blend of hydraulically setting materials that primarily includes hydraulic calcium silicates ($3CaO.SiO_2$ and $2CaO.SiO_2$). Additionally, Portland cement may include one or more forms of calcium sulfate, magnesium oxide, aluminum oxide, and iron oxide. Organic aggregate includes cellulose fibers, wood flakes, and the like.

The facing material of a cementitious panel may include a paper or paperboard material or a woven or non-woven fibers or filaments. A paper or paperboard facing material may include virgin or recycled pulp fibers. In some embodiments a multi-ply paper or paperboard sheet may be utilized. The outward and middle plies of the multi-ply sheet may be sized or treated with starches, resins, or other additives to provide water repellency and control absorption of paints and sealers. The inward ply of the multi-ply sheet may be untreated, allowing the core material to more readily adhere to the facing material. Such as paper material should have sufficient permeability to allow for water vapor to pass through when drying the panels in the oven or kiln. Paper or paperboard is widely used as a facing material because of its low costs. However, paper-faced cementitious panels are generally unsuitable for exterior use or other application where the panels are likely to be exposed to moisture.

In addition or as an alternative to paper or paperboard materials, woven or non-woven fibers or filaments may be used as a facing material. The facing material may take the form of a woven or non-woven fabric or mesh such as a woven mesh or scrim, a non-woven mesh, a non-woven pervious mesh or mat, or the like. Suitable fibers or filaments include fiberglass resins, thermoplastic materials, thermoset materials, and the like. A woven facing material may be formed by knitting or weaving one or more types of fibers or filament. A non-woven facing material may be formed by gluing or fusing chopped strand or staple fibers together with a resinous binder or other adhesive. The fibers in a non-woven facing material may be either randomly distributed or orientated. Exemplary fibers or filaments include glass, olefins, aramid resins, vinyls, polyesters, nylon, cellulosic fiber, and the like. The fibers or filaments may be coated with an alkali resistant material such as an epoxy resin to protect the fibers from alkalinity of the cementitious core material. A woven or non-woven facing material may also be formed from an inorganic material such metal alloys, asbestos, alumina, zirconia, and the like. If desired the facing material may include a mixture of two or more different types of materials, or two or more different facing materials may be used.

In accordance with the present disclosure, the facing material surrounding the cementitious core material is adhered together with a radiation-curable adhesive. The radiation-curable adhesive may include an adhesive that is curable with ultraviolet radiation, infrared radiation, and/or electron-beam radiation. The adhesive typically takes the form of a liquid or flowable viscous material that includes one or more monomers or oligomers, and optionally, an initiator. The radiation-curable adhesive undergoes radiative-curing when exposed to a radiation source (i.e., ultraviolet radiation, infrared radiation, and/or electron-beam radiation). In a radiative-curing process, the initiator and/or the monomers or oligomers are activated by exposure to such radiation, causing the monomers or oligomers in the mixture to undergo radiative polymerization, including chain extension and/or crosslinking. This radiative polymerization conforms the adhesive into a hard material, which is sometimes referred to as curing or radiative-curing.

Any suitable radiation-curable monomers or oligomers may be used. By way of example and without limitation, suitable monomers or oligomers that may be utilized in a radiation-curable adhesive include epoxides, urethanes, polyethers, polyesters, styrenes, acrylates (e.g., acrylic copolymers, methacrylated acrylics, methacrylic copolymers), polyester acrylates (e.g., fatty acid modified polyester acrylates), epoxy acrylates (e.g., fatty acid modified epoxy acrylates, bisphenol epoxy acrylates, novolac epoxy acrylates, a cresol novolac epoxy acrylates, phenol novolac epoxy acrylates), urethane acrylates (e.g., aliphatic urethane acrylates, aromatic urethane acrylates), polyether acrylates (e.g., amine modified polyether acrylates), and amine synergists, vinyl ethers, lactones, lactams, cyclic ethers, cyclic acetyls, cyclic siloxanes, thiol-ene compositions, N-Vinylpyrrolidone, N-vinylcarbazole, and/or combinations thereof. By way of example and without limitation, suitable combinations include unsaturated polyesters combined with styrenes or vinyl ethers. The radiation-curable adhesive may be water-based to facilitate any clean up that may be required. However, radiation-curable adhesives are distinguished from waterborne adhesives such as dextrins, starches, polyvinyl acetates, and the like, which undergo "drying" or "evaporation" process as opposed to a radiative-curing process.

In exemplary embodiments, the radiation-curable adhesive includes one or more of: an epoxide, a urethane, a polyether, a polyester, a styrene, an acrylate, a vinyl ether, a lactone, a lactam, a cyclic ether, a cyclic acetyl, a cyclic siloxane, a thiol-ene composition, N-Vinylpyrrolidone, and/or N-vinylcarbazole. In one embodiment, the radiation-curable adhesive includes an epoxide. In another embodiment, the radiation-curable adhesive includes a urethane. In another embodiment, the radiation-curable adhesive includes a polyether. In another embodiment, the radiation-curable adhesive includes a polyester. In another embodiment, the radiation-curable adhesive includes a styrene. In another embodiment, the radiation-curable adhesive includes an acrylate, such as an acrylic copolymer, a methacrylated acrylic, and/or a methacrylic copolymer. In another embodiment, the radiation-curable adhesive includes a polyester acrylate, such as a fatty acid modified polyester acrylate. In another embodiment, the radiation-curable adhesive includes an epoxy acrylate, such as a fatty acid modified epoxy acrylate, a bisphenol epoxy acrylate, a novolac epoxy acrylate, a cresol novolac epoxy acrylate, and/or a phenol novolac epoxy acrylate. In another embodiment, the radiation-curable adhesive includes a urethane acrylate, such as an aliphatic urethane acrylate and/or an aromatic urethane acrylate. In another embodiment, the radiation-curable adhesive includes a polyether acrylate, such as an amine modified polyether acrylate. In another embodiment, the radiation-curable adhesive includes an amine synergists. In another embodiment, the radiation-curable adhesive includes a vinyl ether. In another embodiment, the radiation-curable adhesive includes a lactone. In another embodiment, the radiation-curable adhesive includes a lactam. In another embodiment, the radiation-curable adhesive includes a cyclic ether. In another embodiment, the radiation-curable adhesive includes a cyclic acetyl. In another embodiment, the radiation-curable adhesive includes a cyclic siloxane. In another embodiment, the radiation-curable adhesive includes a thiol-ene composition. In another embodiment, the radiation-curable adhesive includes N-Vinylpyrrolidone. In another embodiment, the radiation-curable adhesive includes N-vinylcarbazole. In another embodiment, the radiation-curable adhesive includes an unsaturated polyester combined with a styrene or a vinyl ether.

The when the radiation-curable adhesive includes a polyester acrylate, the polyester acrylate may have a number-average molecular weight ranging from 400 to 5,000 g/mol, such as from 450 to 3,500 g/mol, from 500 to 3,000 g/mol, from 1,000 to 3,000 g/mol, from 1,200 to 2,500 g/mol, from 1500, 2,000, such as greater than 400 g/mol, such as greater than 450 g/mol, such as greater than 500 g/mol, such as greater than 1,000 g/mol, such as greater than 1,200 g/mol, such as greater than 1,500 g/mol, such as greater than 2,500 g/mol, such as greater than 3,000 g/mol, such as greater than 3,500 g/mol, such as greater than 4,000 g/mol, such as greater than 4,500 g/mol. The polyester acrylate may have a number-average molecular weight that is 5,000 g/mol or less, such as 4,500 g/mol or less, such as 4,000 g/mol or less, such as 3,500 g/mol or less, such as 3,000 g/mol or less, such as 2,500 g/mol or less, such as 2,000 g/mol or less, such as 1,500 g/mol or less, such as 1,000 g/mol or less, such as 500 g/mol or less.

The initiator may include an ionic initiator or a free radical initiator. Suitable ionic initiators include onium salts, such as sulfonium or idonium salts. An exemplary sulfonium salt includes triarylsulfonium hexafluoroantimonate. An example idonium salt includes bis(4-tert-butylphenyl)idonium perfluoro-1-butanesulfonate. Other suitable ionic initiators include organometallic salts, and pyridinium salts. In one embodiment, the ionic initiator includes a free radical initiator. In another embodiment, the ionic initiator includes an onium salt. For example, in one embodiment the onium salt includes a sulfonium salt, and in another embodiment the onium salt includes an idonium salt. In yet another embodiment, the sulfonium salt includes triarylsulfonium hexafluoroantimonate. In yet another embodiment, the idonium salt includes bis(4-tert-butylphenyl)idonium perfluoro-1-butanesulfonate. In another embodiment, the ionic initiator includes an organometallic salt. In another embodiment, the ionic initiator includes a pyridinium salt.

Suitable initiators that utilize a free radical pathway include unimolecular cleavage pathway and two-component abstraction pathway. With the unimolecular cleavage pathway, two free radicals are generated by cleavage of the initiator upon exposure to radiation. Exemplary initiators that utilize a unimolecular cleavage pathway included benzoin ethers, acetophenones, benzoyl oximes, and acylphosphines. In one embodiment, the ionic initiator includes a benzoin ether. In another embodiment, the ionic initiator includes an acetophenone. In another embodiment, the ionic initiator includes a benzoyl oxime. In another embodiment, the ionic initiator includes an acylphosphine.

With the two-component abstraction pathway, a free radical is generated through abstraction of a hydrogen atom from a co-initiator, typically an alcohol or an amine. Exemplary initiators that utilize a two-component abstraction pathway include benzophenones, xanthones, and quinones. In one embodiment, the ionic initiator includes a benzophenone. In another embodiment, the ionic initiator includes a xanthone. In another embodiment, the ionic initiator includes a quinone.

The radiation may be any type of radiation known in the art for curing such radiation-curable adhesives. For example, the radiation may be ultraviolet radiation, infrared radiation, or electron-beam radiation. In one embodiment, the radiation may be ultraviolet radiation. In another embodiment, the radiation may be infrared radiation. In another embodiment, the radiation may be electron-beam radiation.

The radiation may be provided by any suitable radiation-emitting device, examples of which are further described below. Without being bound to any particular theory, radiation from such a device generates free radicals and/or ionic species, which go on to initiate crosslinking and/or polymerization reactions. Initiators that form free radicals when exposed to such radiation are sometimes referred to as free radical initiators. Initiators that form ionic species when exposed to such radiation are sometimes referred to as ionic initiators. The free radicals and/or ionic species may be generated in the initiator and/or directly in the monomers or oligomers. Higher-intensity radiation may readily generate free radicals and/or ionic species directly in the monomers or oligomers. For example, electron-beam radiation may exhibit sufficient radiative energy to generate free radicals or ionic species directly in the monomers or oligomers such that an initiator may not be necessary for initiating radiative polymerization and curing. On the other hand, lower-intensity radiation may not sufficiently generate free radicals or ionic species in the monomers or oligomers, in which case an initiator may be necessary to initiate radiative polymerization and curing of the monomers or oligomers. For example, an initiator typically is necessary with ultraviolet radiation, although such radiation may generate free radicals or ionic species in some monomers or oligomers which may be sufficient for curing. Regardless, an initiator may nevertheless be desirable, whether using ultraviolet, infrared, or electron-beam radiation.

These free radicals or ionic species, whether initially generated in the initiator and/or directly in the monomers or oligomers, go on to cause the monomers and/or oligomers in the adhesive mixture to undergo cross-linking and other polymerization reactions. These reactions consist of three steps: initiation, propagation, and termination. The ultraviolet, infrared, or electron-beam radiation initiates the formation of radical or ionic species. Polymerization proceeds via propagation steps that occur by the successive addition of monomers or oligomers as the radical or ionic species transfers to the polymer chain or matrix formed thereby. Termination occurs by several processes including combination, disproportionation, chain transfer, and radical trapping.

The makeup of the facing material and the radiative-curing pathway should be selected in consideration of one another. The facing material should be sufficiently porous to the radiative beam, and/or the radiative beam should be capable of penetrating the facing sheet. Typically, with ultraviolet radiation, the free radical pathway will be limited by the thickness and/or opacity of the facing material since photons that make up the ultraviolet radiative beam tend to be absorbed by the material making up the facing sheet. Conversely, the cationic pathway for ultraviolet radiative-curing continues to propagate through and polymerize monomers or oligomers even without continued exposure to ultraviolet radiation. As such, the cationic pathway tends to be less sensitive to the thickness or opacity of the facing material. Additionally, electron radiative beams tend not to be absorbed by the facing sheet, and as such the thickness and opacity of the facing sheet are less meaningful limitations to electron-beam radiation. Thus, either cationic ultraviolet radiation-curable adhesives, or electron-beam radiation-curable adhesives, may be particularly suitable for thick or opaque facing materials.

However, electron-beam radiative curing may require that the curing area be purged with an inert gas. Ultraviolet radiative curing may be more readily accomplished in open air, yet the free radical pathway tends to be partly inhibited by the presence of oxygen, which reacts with free radicals to form peroxides which can inhibit polymerization. On the other hand, the presence of oxygen typically does not affect the cationic pathway for ultraviolet radiative-curing. Where oxygen inhibition may be a concern, an amine synergist may be included in the radiation-curable adhesive to reduce oxygen inhibition of the radiative-curing. Where the configuration of the facing material might inhibit photon penetration, an auxiliary cure additive may be included in the radiation-curable adhesive. The auxiliary cure additive may provide a thermal, moisture, oxidative, or anaerobic curing pathway, which may work in cooperation with the radiative-curing pathway.

In some embodiments, the radiation-curing adhesive may include multiple adhesive components that are curable by multiple different or alternative curing pathways, including adhesive components that are curable by any one or more of ultraviolet radiation, infrared radiation, and electron-beam radiation. For example, in one embodiment a radiation-curable adhesive may be selected so as to be primarily curable with ultraviolet radiation, but may also be curable with infrared radiation or electron-beam radiation. In another embodiment, a radiation-curable adhesive may be selected to be primarily curable with infrared radiation, but may also be curable with ultraviolet radiation or electron-beam radiation. In another embodiment, a radiation-curable adhesive may be selected to be primarily curable with electron beam radiation, but may also be curable with infrared radiation or ultraviolet radiation.

Suitable ultraviolet radiation-emitting devices typically utilize a mercury vapory lamp, a fluorescent lamp, or an LED array. Mercury vapor lamps include H type, which outputs in the short wave ultraviolet range between 220 and 320 nm, D type, which includes an iron additive, and outputs in the long wave ultraviolet range between 350 and 400 nm, and V type, which includes a gallium additive, and outputs in the long wave ultraviolet range between 400 and 450 nm. Mercury vapor lamps tend to output a significant amount of heat, which may be undesirable in some implementations. Fluorescent lamps can be provided that output anywhere in the ultraviolet spectrum, including with multiple peaks, which allows for a wider variety of initiators to be used. Fluorescent lamps output less heat than mercury vapor lamps, require less energy, and do not require a warmup or period before use. Suitable LED arrays also may be provided, which advantageously do not require a warmup period before use. Suitable ultraviolet radiation-emitting devices are commercially available.

Suitable electron-beam radiation-emitting devices may provide a dose of 25 to 150 kGy absorbed by the radiation-curable adhesive material. Typically such a device will have an operating voltage of 80 to 300 kV, and a beam current of up to 200 mA, with a throughput capability of 5,000 to 15,000 KGy m/min. Suitable electron-beam radiation-emitting devices are commercially available.

Suitable infrared radiation-emitting devices include infrared lamps having a localized target area. Suitable infrared radiation-emitting devices are commercially available. An example commercially available infrared lamp is the LineIR Model 5194 Infrared Heater (Research Inc.—Eden Prairie, Minn.).

The rate of initiation for a radiation-curable adhesive can be expressed as $R_i=IGf$, where I is the radiative beam intensity or current, and G and f are efficiency factors for the production of initiating species and their initiating efficiency, respectively. The G value depends on the chemical structure of the radiated material. Unsaturated materials have G values hundreds of times larger than saturated moieties. Curing times for exemplar radiation-curable adhesives may range from a fraction of one second to several minutes. For example, an exemplary curing time may range from less than one-second to greater than one-minute, such as between 1 to 30 minutes, between 1 to 20 minutes, between 1 to 15 minutes, between 1 to 10 minutes, between 1 to 5 minutes, between 1 to 2 minutes, between 1 to 60 seconds, between 1 to 30 seconds, between 1 to 20 seconds, between 1 to 10 seconds, or between 1 to 5 seconds, such as 0.01 minutes or more, such as 0.05 minutes or more, such as 0.1 minute or more, such as 0.25 minute or more, such as 0.5 minute or more, such as 0.75 minute or more, such as 1 minute or more, such as 2 minutes or more, such as 3 minutes or more, such as 4 minutes or more, such as 5 minutes or more, such as 6 minutes or more, such as 7 minutes or more, such as 8 minutes or more, such as 9 minutes or more, such as 10 minutes or more, such as 12 minutes or more, such as 15 minutes or more, such as 18 minutes or more, such as 20 minutes or more, such as 22 minutes or more, such as 25 minutes or more, or such as 28 minutes or more. The curing time may be 30 minutes or less, such as 28 minutes or less, such as 25 minutes or less, such as 22 minutes or less, such as 20 minutes or less, such as 18 minutes or less, such as 15 minutes or less, such as 12 minutes or less, such as 10 minutes or less, such as 9 minutes or less, such as 8 minutes or less, such as 7 minutes or less, such as 6 minutes or less, such as 5 minutes or less, such as 4 minutes or less, such as 3 minutes or less, such as 2 minutes or less, such as 1 minute or less, such as 0.75 minute or less, such as 0.5 minute or less, such as 0.25 minute or less, such as 0.1 minute or less, such as 0.05 minute or less, or such as 0.01 minute or less.

Advantageously, a rapid curing time may be provided, thereby minimizing bleed through, accumulation of adhesives on the manufacturing equipment, and/or redisposition of adhesives on the cementitious panels. In some embodiments, the radiation-curable adhesive need not be fully cured immediately upon exposure to the radiative beam or beams. However, if not fully cured, typically it will be desirable for the radiative beam or beams to provide a radiation dose effective to at least partly cure the radiation-curable adhesive, for example, to an extent sufficient to minimize bleed through, accumulation of adhesives on the manufacturing equipment, and/or redisposition of adhesives on the cementitious panels. For example, the radiation-curable adhesive may be at least partly cured or substantially cured prior to various subsequent processing steps where the adhesive may otherwise be susceptible to accumulate on manufacturing equipment. This may include the radiation-curable adhesive being substantially cured prior to cutting the continuous length of cementitious panel material, prior to turning the cementitious panel over, and/or prior to heating the cementitious panel in the oven or kiln. With the radiation-curable adhesive being substantially cured at these points in the manufacturing process, the adhesive will be less likely to accumulate on such manufacturing equipment, and less likely to redeposit on the cementitious panels.

In some embodiments, the speed of the conveyor assembly, the cure rate of the radiation-curable adhesive, and/or the dose rate of the radiation emitted from the one or more radiation-emitting devices may be selected at least in part such that the radiation-curable adhesive substantially cures prior to a subsequent processing step, such as prior to cutting the continuous length of cementitious panel material with the cutting device. It will be appreciated that radiation-curable adhesives typically undergo curing according to a logarithmic or asymptotic curve, and that the radiation-curable adhesive may be deemed substantially radiation-cured as the rate of curing begins to asymptotically decline such that the tangent of the curing curve has a slope of less than 45 degrees. Depending on the formulation of the radiation-curable adhesive, the rate of curing may begin to asymptotically decline such that the radiation-curable adhesive may be deemed substantially radiation-cured when the radiation-curable adhesive is between 60% to 99% cured, between 70% to 99% cured, 80% to 99% cured, or 90% to 99% cured, such as 60% cured or more, such as 65% cured or more, such as 70% cured or more, such as 75% cured or more, such as 80% cured or more, such as 85% cured or more, such as 90% cured or more, such as 95% cured or more, such as 99% cured or more. The rate of curing may begin to asymptotically decline such that the radiation-curable adhesive may be deemed substantially radiation-cured when the radiation-curable adhesive is 99% cured or less, such as 95% cured or less, such as 90% cured or less, such as 85% cured or less, such as 80% cured or less, such as 75% cured or less, such as 70% cured or less, or such as 65% cured or less.

Exemplary embodiments will now be discussed in further detail with reference to the accompanying figures. It is understood that terms "upstream" and "downstream" refer to the relative direction that a material travels with respect to a process. For example, "upstream" refers to the direction from which a material travels, and "downstream" refers to the direction to which the material travels. It is also understood that terms such as "top", "bottom", "outward", "inward", and the like are words of convenience and are not to be construed as limiting terms. As used herein, the terms "first", "second", "third", and "fourth" may be used interchangeably to distinguish one component from another and are not intended to signify importance of the individual components. The terms "a" and "an" do not denote a limitation of quantity, but rather denote the presence of at least one of the referenced item.

Here and throughout the specification and claims, range limitations are combined and interchanged, and such ranges are identified and include all the sub-ranges contained therein unless context or language indicates otherwise. For example, all ranges disclosed herein are inclusive of the endpoints, and the endpoints are independently combinable with each other.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems.

Now referring to FIG. 1, an exemplary system 100 for manufacturing cementitious panels is shown. The exemplary system 100 includes a conveyor assembly 102 such as a continuous belt or fabric, a cementitious core material supply manifold 104 positioned above a surface of the continuous belt or fabric of the conveyor assembly 102. The cementitious core material supply manifold includes an outlet 106 configured to apply a slurry of cementitious core material 108. The slurry of cementitious core material may be provided from a slurry storage tank 109, which may be provided in the form of a permanent tank, a portable tote, or rolling stock equipped with a tank or tote. The exemplary system 100 further includes a facing material supply assembly 110 configured to supply to the conveyor assembly 102 a plurality of sheets of facing material 112 from a plurality of facing material supply rolls 114. In one embodiment, the plurality of sheets of facing material include an upper sheet and a lower sheet. For purposes of convenience, the lower sheet refers to the sheet of facing material that is closer to the conveyor assembly 102, and the upper sheet refers to the sheet of facing material that is further away from the conveyor assembly. Typically cementitious panels are formed front-side down, such that the lower sheet corresponds to the front-side of the panel. However, cementitious panels may also be formed back-side down, such that the lower sheet corresponds to the back-side of the panel. The exemplary embodiments that follow describe a system for manufacturing cementitious panels in which the panels are formed front-side down. However, these examples are provided by way of illustration only and should not be interpreted at limiting the present disclosure.

As shown in FIG. 1, a lower facing material supply assembly 116 supplies a lower sheet of facing material 118 to the conveyor assembly 102 from a lower facing material supply roll 120. An upper facing material supply assembly 122 supplies an upper sheet of facing material 124 to the conveyor assembly 102 from an upper facing material supply roll 126. As discussed below with respect to FIG. 3B, the exemplary system 100 may also include first and second edge facing material supply roll assemblies, which may respectively supply first and second strips of edge facing material to the conveyor assembly 102 from first and second edge facing material supply rolls.

The exemplary system 100 further includes a plurality of adhesive applicators 128 configured to apply a radiation-curable adhesive 130 to the lower sheet of facing material 118 and/or to the upper sheet of facing material 124. Suitable applicators 128 include brushes, rollers, spreaders, quills, nozzles, sprayers, drippers, and combinations thereof. The radiation-curable adhesive 130 may be applied in any suitable manner. For example, the applicators 128 may provide a continuous or intermittent application of radiation-curable adhesive 130, such as in the form of a suitably flowable and/or suitably viscous or semi-viscous stream or spray of radiation-curable adhesive. The radiation-curable adhesive may be applied in a sufficient quantity to adhere the sheets of facing material to one another. As applied, the radiation-curable adhesive may take the form of one or more continuous or intermittent patterns of ribbons, beads, lines, dots, or spots on the lower sheet of facing material 118 and/or to the upper sheet of facing material 124. In one embodiment, the radiation-curable adhesive is applied in the form of a continuous ribbon, bead, or line. In another embodiment, the radiation-curable adhesive is applied in the form of an intermittent pattern of ribbons, beads, lines, dots, or spots. When applying the radiation-curable adhesive 130, care should be taken to avoid over use, so as to prevent bleed-through, bleed out or seeping from the edges, and to encourage proper and timely curing.

The radiation-curable adhesive may be provided from an adhesive storage tank 131, which may be provided in the form of a permanent tank, a portable tote, or rolling stock equipped with a tank or tote. As shown in FIG. 1, the plurality of adhesive applicators are located in a position so as to apply the radiation-curable adhesive to the lower sheet of facing material 118. Additional adhesive applicators 128 can be located in a position so as to apply the radiative curing adhesive 130 to the upper sheet of facing material 126, or the adhesive applicators 128 can be relocated from the position corresponding to the lower sheet of facing material 118 to the location corresponding to the upper sheet of facing material 126.

The exemplary system 100 further includes a forming assembly 132 configured to form a continuous length of cementitious panel material 134, and one or more radiation-emitting devices 136 configured to configured to emit one or more radiative beams to initiate curing and at least partly cure the radiation-curable adhesive. After passing through the forming assembly 132, the continuous length of cementitious panel material 134 is cut with a cutting device 138 such as a saw blade, water knife, or other suitable device to provide a series of sequential cementitious panels 140 of a desired length. Typically the cutting device 138 will be positioned a sufficient distance downstream from the forming assembly 132 such that the core material has set sufficiently to retain its shape. In some embodiments, vacuum boxes may be positioned along the conveyor assembly 102 to remove excess water. Additionally the cutting device 138 should be positioned a sufficient distance downstream from the radiation-emitting devices 136 such that the radiation-curable adhesive 130 may at least partly cure prior to cutting the cementitious panels 140 so as to minimize accumulation of adhesive material that may be exposed from cutting, and such that the adhesive 130 may help retain the shape of the cementitious panels during and after cutting.

The cementitious panels continue along the conveyor assembly 102 for some distance, allowing the cementitious core material to further cure. Typically the cementitious panels 140 are formed front-side down, and after the cementitious panels 140 have sufficiently cured, they are typically turned front-side up at a wet transfer table 142 to protect the front side of the panels from being damaged by the conveyor assembly 102. The wet transfer table 142 may include an articulating lifting and lowering mechanism 144, which has a first set of forks or arms that lift the cementitious panel from its first broad face onto its edge, and a second set of forks or arms that lower the cementitious panel onto its opposite side, bringing the cementitious panel to rest on its second broad face. The cementitious panels 140 are dried in an oven or kiln 146 to evaporate excess (free) water. The cementitious panels 140 are typically dried front-side up, as the wet transfer table 142 with an articulating lifting and lowering mechanism 144 is typically provided to turn the cementitious panel over prior to heating the cementitious panel in the oven or kiln 146. Typically the cementitious core material 108 partially sets prior to being heated in the oven or kiln 146, and then further at least partially sets during heating in the oven or kiln 146. After exiting the oven or kiln 146, dried cementitious panels 148 are bundled in pairs of two, with front-sides facing one another, at a dry transfer table 150. The dry transfer table typically includes a similar articulating lifting and lowering mechanism 152, which lifts and lowers a first cementitious panel on top of a second cementitious panel. The dried panels 148 may be further cut to desired sizes and bundled together for transfer to a warehouse or for shipping, using various forms of finishing equipment 154.

Figure 2A:
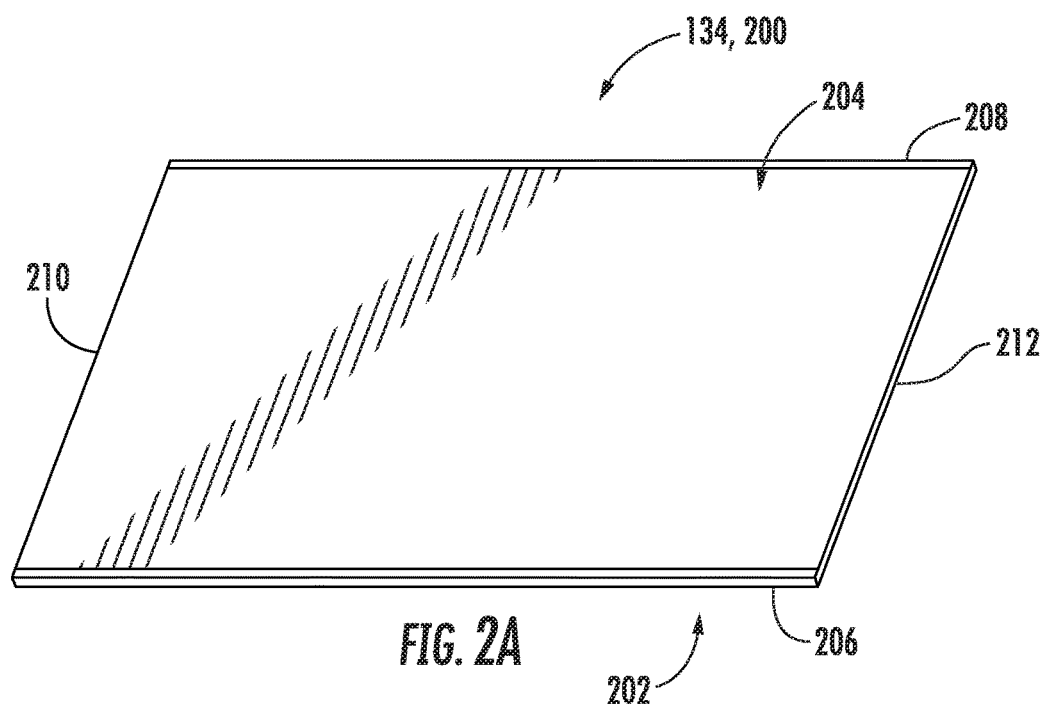
FIGS. 2A and 2B respectively show a perspective view and a lateral cross-sectional view of an exemplary cementitious panel which may be manufactured using the system shown in FIG. 1.
Figure 2B:
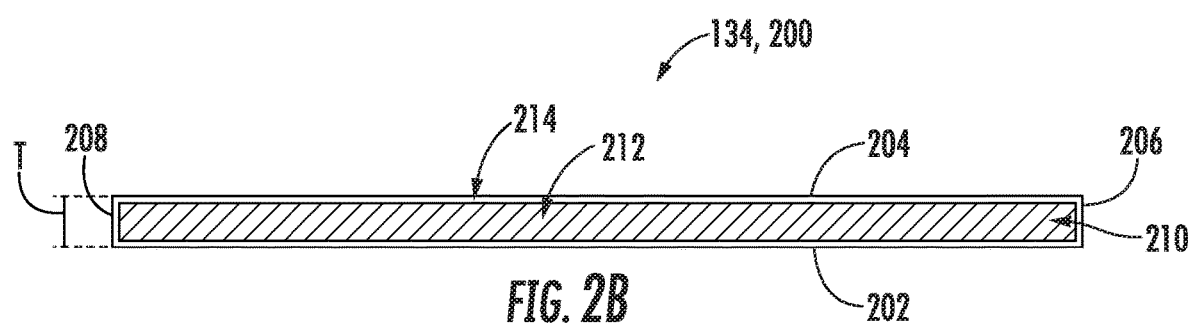

Exemplary cementitious panels and further aspects of the exemplary system 100 for manufacturing cementitious panels will now be described in greater detail with reference to FIGS. 2A and 2B, 3A and 3B, and 4A-4D. An exemplary cementitious panel that may be formed using the exemplary system 100 is shown in FIGS. 2A and 2B. Additionally, FIGS. 2A and 2B may be seen as depicting an exemplary cross-section of a continuous length of cementitious panel material 134 formed using the exemplary system 100. As shown, the continuous length of cementitious panel material 134, or an exemplary cementitious panel 200 obtained therefrom, includes a first broad face 202, a second broad face 204, a first longitudinal side 206, and a second longitudinal side 208. The cementitious panel 200 further includes a first lateral end 210 and a second lateral end 212. The cementitious panel 200 includes a core material 212 surrounded by a plurality of sheets of facing material 214. Cementitious panels may be formed with any desired dimensions. Standard dimensions for wallboard applications typically call for panels that are about 4-foot wide and about 8-foot to 16-foot long, with a thicknesses of about ¼-inch to 2-inch. Of course, cementitious panels may also be manufactured according to other standard or non-standard dimensions.

Figure 3A:
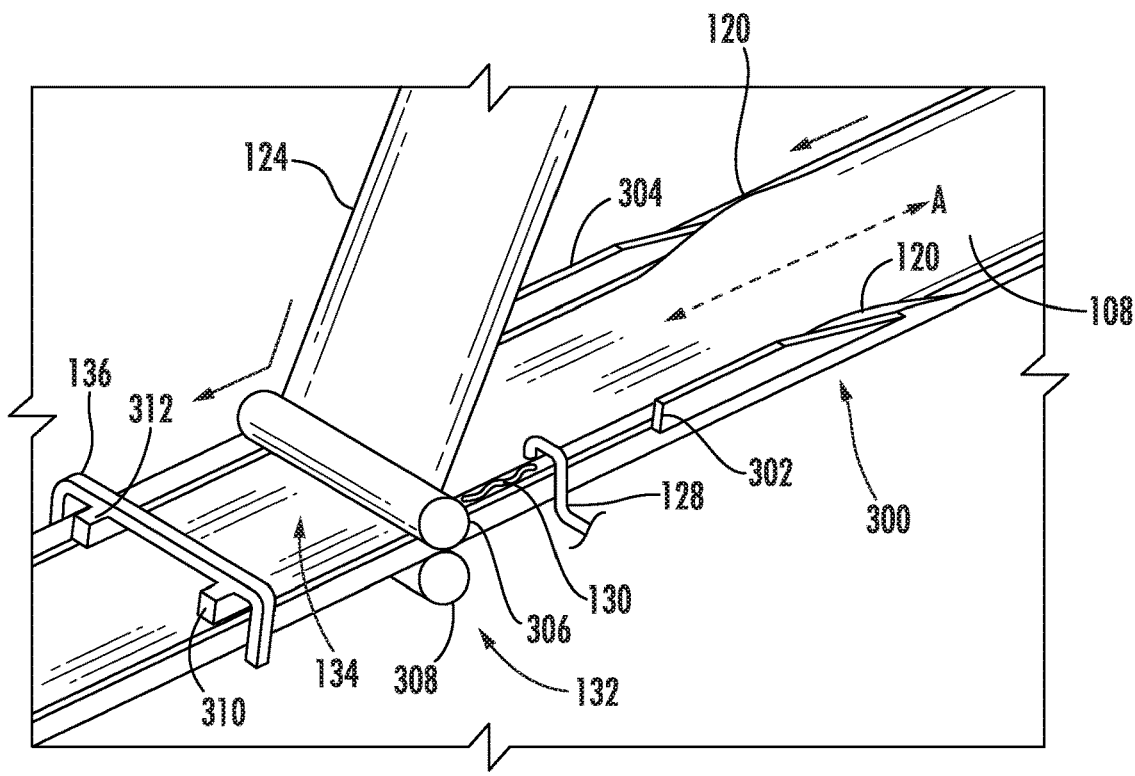
FIGS. 3A and 3B schematically show exemplary features which may be included in the system shown in FIG. 1.
Figure 3B:
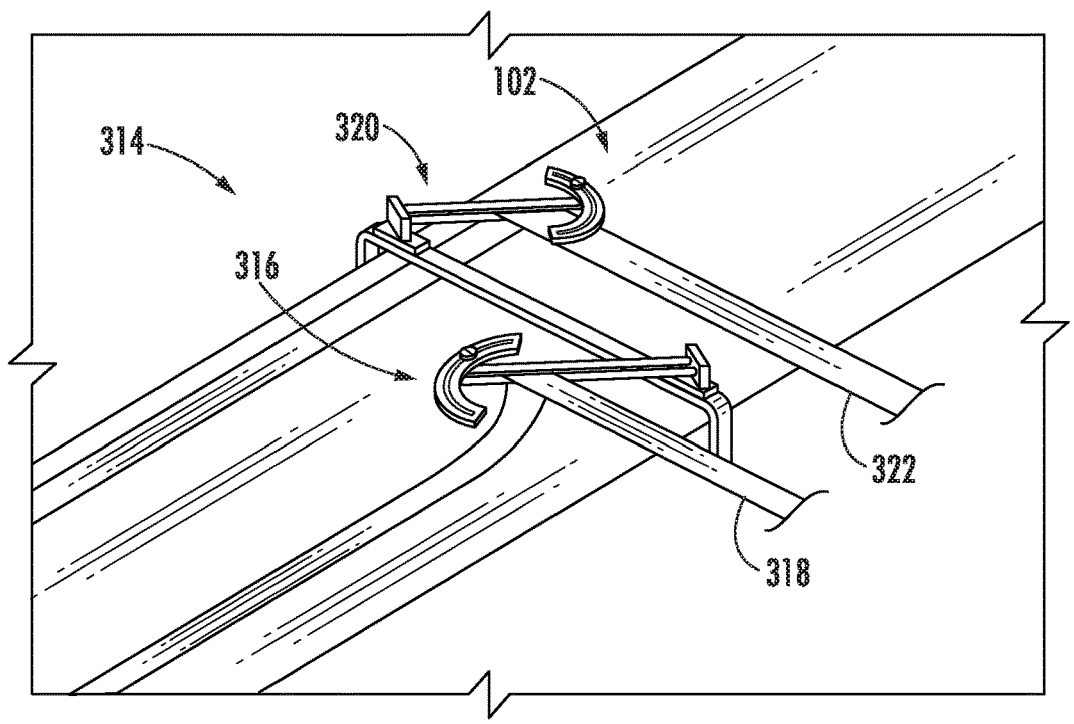

Referring now to FIGS. 3A and 3B, aspects of the exemplary system 100 for manufacturing cementitious panels are shown in greater detail. The forming assembly 132 forms a continuous length of cementitious panel material 134, by surrounding the slurry of cementitious core material 108 with the plurality of sheets of facing material 112. In some embodiments, the cementitious core material supply manifold 104 may be configured to apply the slurry of cementitious core material 108 between the lower sheet of facing material 118 and the upper sheet of facing material 124, with the lower sheet of facing material defining the first broad face 202 and the upper sheet of facing material defining the second broad face 204 of the cementitious panel material 134. The exemplary system 100 may additionally include equipment for providing edge facing sheets as discussed below with respect to FIG. 3B.

As shown in FIG. 3A, the forming assembly 132 may include a longitudinal side wrapping assembly 300 configured to wrap the lower sheet of facing material 118 from the first broad face 202 and onto the second broad face 204 of the cementitious panel material 134, thereby defining the first longitudinal side 206 and/or the second longitudinal side 208 of the cementitious panel material 134. The longitudinal side wrapping assembly 300 is located a lateral distance from a longitudinal axis, A, of the continuous belt or fabric of the conveyor assembly. The distance of the longitudinal side wrapping assembly 300 from the longitudinal axis A defines the width of the continuous length of panel material 134. The longitudinal side wrapping assembly 300 may include a first side wrapping assembly 302 and a second side wrapping assembly 304. The first side wrapping assembly 302 may be configured to wrap a first longitudinal edge of the lower sheet of facing material 118 from the first broad face 202 and onto the second broad face 204 of the cementitious panel material 134, thereby defining the first longitudinal side of the cementitious panel material 206. The a second side wrapping assembly 304 may be configured to wrap a second longitudinal edge of the lower sheet of facing material 118 from the first broad face 202 and onto the second broad face 204 of the cementitious panel material 134, thereby defining the second longitudinal side 208 of the cementitious panel material 134.

The forming assembly 132 may additionally include a pair of parallel plates or rolls 306, 308, separated from one another by a distance selected to define the thickness T of the continuous length of cementitious panel material 134. The conveyor assembly 102 feeds the plurality of sheets of facing material 112 and the slurry of core material 108 between the parallel plates or rolls 306, 308, thereby defining the first broad face 202 an the second broad face 204 of the cementitious panel material 134. The upper sheet of facing material 124 extends along the second broad face 204 of the cementitious panel material 134. The lower sheet of facing material 118 may overlap or underlap the upper sheet of facing material 124 on the second broad face 204.

As shown in FIG. 3A, the forming assembly 132 is configured to form cementitious panel material 134 with the lower sheet of facing material 118 underlapping the upper sheet of facing material 124. However, the forming assembly 132 may also be configured such that the lower sheet of facing material 118 overlaps the upper sheet of facing material 124. For example, as shown in FIG. 3A, the longitudinal side wrapping assembly 300 is positioned upstream from the parallel plates or rolls 306, 308. The upper facing material supply assembly 122 is configured to supply the upper sheet of facing material 124 to the conveyor assembly 132 downstream from the longitudinal side wrapping assembly 300, including the first side wrapping assembly 302 and/or the second side wrapping assembly 304. The longitudinal side wrapping assembly 300 wraps the lower sheet of facing material 118 from the first broad face 202 and onto the second broad face 204 of the cementitious panel material 134 prior to the upper sheet of facing material 124 being brought into position along the second broad face 204. As such, the lower sheet of facing material 118 underlaps the upper sheet of facing material 124. This may include the first longitudinal edge of the lower sheet of facing material 118 underlapping the first longitudinal edge of the upper sheet of facing material 124 on the second broad face 204, and/or the second longitudinal edge of the lower sheet of facing material 118 underlapping the second longitudinal edge of the upper sheet of facing material 124 on the second broad face 204.

In another embodiment, the longitudinal side wrapping assembly 300 may be positioned downstream from the parallel plates or rolls 306, 308, and the upper facing material supply assembly 122 may be configured to supply the upper sheet of facing material 124 to the conveyor assembly 132 upstream from the longitudinal side wrapping assembly 300, including the first side wrapping assembly 302 and/or the second side wrapping assembly 304. As such, the lower sheet of facing material 118 would overlap the upper sheet of facing material 124. This may include the first longitudinal edge of the lower sheet of facing material 118 overlapping the first longitudinal edge of the upper sheet of facing material 124 on the second broad face 204, and/or the second longitudinal edge of the lower sheet of facing material 118 overlapping the second longitudinal edge of the upper sheet of facing material 124 on the second broad face 204.

As also shown in FIG. 3A, the one or more adhesive applicators 128 are configured to apply the radiation-curable adhesive to the lower sheet of facing material 118. The one or more adhesive applicators may be configured and arranged in any desired orientation so as to adhere a first longitudinal edge of the lower sheet of facing material to a first longitudinal edge of the upper sheet of facing material, and so as to adhere a second longitudinal edge of the lower sheet of facing material to a second longitudinal edge of the upper sheet of facing material. In one embodiment, the radiation-curable adhesive is applied to the outward-facing underlapping surface of the lower sheet of facing material 118 such that the radiation-curable adhesive will contact the upper sheet of facing material 124 when the upper sheet of facing material 124 is brought into position along the second broad face 204 of the cementitious panel material 134. The one or more adhesive applicators 128 may include a first adhesive applicator configured to apply the radiation-curable adhesive to the first longitudinal edge of the lower sheet of facing material 118, and a second adhesive applicator configured to apply the radiation-curable adhesive to the second longitudinal edge of the lower sheet of facing material 118. Alternatively, the one or more adhesive applicators 128 may be repositioned, or additional adhesive applicators 128 may be provided, so as to apply the radiation-curable adhesive to the underside of the upper sheet of facing material 124 such that the radiation-curable adhesive will contact the lower sheet of facing material 124 underlapping the upper sheet of facing material 124. In this embodiment, the one or more adhesive applicators 128 may include a first adhesive applicator configured to apply the radiation-curable adhesive to the first longitudinal edge of the upper sheet of facing material 124, and a second adhesive applicator configured to apply the radiation-curable adhesive to the second longitudinal edge of the upper sheet of facing material 124.

On the other hand, with the forming assembly 134 configured such that the lower sheet of facing material 118 overlaps the upper sheet of facing material 124, the adhesive applicators 128 should be positioned accordingly. For example, adhesive applicators 128 may be positioned so as to apply the radiation-curable adhesive to the underside of the lowerسheet of facing material 118 prior to the longitudinal side wrapping assembly 300 wrapping the lower sheet of facing material 118 from the first broad face 202 and onto the second broad face 204 of the cementitious panel material 134, thereby overlapping the upper sheet of facing material 124. Alternatively, or in addition, adhesive applicators 128 may be positioned so as to apply the radiation-curable adhesive 130 to the outward-facing underlapping surface of the upper sheet of facing material 124, such that the lower sheet of facing material 118 will contact the adhesive when the longitudinal side wrapping assembly 300 wraps the lower sheet of facing material 118 from the first broad face 202 and onto the second broad face 204 of the cementitious panel material 134.

The one or more radiation-emitting devices 136 are located so as to emit one or more radiative beams in proximity to the portion of the cementitious panel material 134 where the radiation-curable adhesive has been applied. In one embodiment, the one or more radiation-emitting devices may include an ultraviolet radiation-emitting device, and the radiation-curable adhesive may include an adhesive that is curable with ultraviolet radiation. In another embodiment, the one or more radiation-emitting devices may include an ultraviolet radiation-emitting device, and the radiation-curable adhesive may include an adhesive that is curable with infrared radiation. In yet another embodiment, the one or more radiation-emitting devices may include an electron-beam radiation-emitting device, and the radiation-curable adhesive may include an adhesive that is curable with electron-beam radiation. In some embodiments, the radiation-curing adhesive may include multiple adhesive components that are curable by multiple different or alternative curing pathways, including adhesive components that are curable by any one or more of ultraviolet radiation, infrared radiation, and electron-beam radiation.

The radiation-emitting devices 136 are configured to provide a radiation dose effective to at least partly cure the radiation-curable adhesive, so as to adhere the lower sheet of facing material to the upper sheet of facing material. As shown in FIG. 3A, a first radiation-emitting device 310 may be positioned in proximity to a first longitudinal edge of the cementitious panel material 134 and a second radiation-emitting device 312 may be positioned in proximity to a second longitudinal edge of the cementitious panel material 134, such that the radiative beams from such devices are emitted in proximity to the portion of the cementitious panel material 134 where the radiation-curable adhesive has been applied. The radiation emitting devices 136 may be positioned upstream or downstream from the forming assembly 132. As shown, the radiation emitting device 136 is positioned immediately downstream from the forming assembly 132. In another embodiment, the radiation emitting device 136 may be positioned immediately upstream from the forming assembly 132. When the radiation emitting device 136 is positioned immediately upstream from the forming assembly, radiation may be emitted in such a manner that the radiative curing reaction.

Now referring to FIG. 3B, in some embodiments the exemplary system 100 may include edge facing equipment 314 configured to provide one or more strips of edge facing material to the conveyor assembly 102, for forming cementitious panels that include one or more strips of edge facing material. This edge facing equipment 314 may include a first edge facing material supply assembly 316 configured to supply a first strip of edge facing material 318, and a second edge facing material supply assembly 320 configured to supply a second strip of edge facing material 322. The first strip of edge facing material 318 is supplied to the first edge facing material supply assembly 316 by a first edge facing material supply roll (not shown). The second strip of edge facing material 322 is supplied to the second edge facing material supply assembly 320 by a second edge facing material supply roll (not shown). The edge strips may be wrapped from the first broad face 202 and onto the second broad face 204 of the cementitious panel material 134, together with or as an alternative to the lower sheet of facing material 118, thereby at least partly defining the longitudinal sides 206, 208 of the cementitious panel material 134. The edge facing equipment 314 may be configured to supply the strips of edge facing material 318, 322 upstream or downstream from the lower facing material 118 and/or the upper facing material 124. The strips of edge facing material 318, 322 may underlap the lower facing material 118 and the upper edge facing material 124, or the edge facing material 318, 322 may overlap the lower facing material 118 and the upper edge facing material 124. Alternatively, the strips of edge facing material 318, 322 may underlap the lower facing material 118 and overlap the upper edge facing material 124, or vice versa.

The longitudinal side wrapping assembly 300 may be configured to wrap the sheets of edge facing material 318, 322 from the first broad face 202 and onto the second broad face 204 of the cementitious panel material 134, thereby defining the first longitudinal side 206 and/or the second longitudinal side 208 of the cementitious panel material 134. The first side wrapping assembly 302 may be configured to wrap a first longitudinal edge of the first sheet of edge facing material 318 from the first broad face 202 and onto the second broad face 204 of the cementitious panel material 134, thereby defining the first longitudinal side of the cementitious panel material 206. The a second side wrapping assembly 304 may be configured to wrap a second longitudinal edge of the second sheet of edge facing material 118 from the first broad face 202 and onto the second broad face 204 of the cementitious panel material 134, thereby defining the second longitudinal side 208 of the cementitious panel material 134.

The forming assembly 132 may be configured with respect to the edge facing equipment 314 to form cementitious panel material 134 with the sheets of edge facing material 318, 322 underlapping the upper sheet of facing material 124. However, the forming assembly 132 may also be configured such that the sheets of edge facing material 318, 322 overlap the upper sheet of facing material 124.

For example, the edge facing equipment 314 may be positioned so as to introduce the strips of edge facing material 318, 322 to the longitudinal side wrapping assembly 300 upstream from the parallel plates or rolls 306, 308. The upper facing material supply assembly 122 may be configured to supply the upper sheet of facing material 124 to the conveyor assembly 132 downstream from the longitudinal side wrapping assembly 300, including the first side wrapping assembly 302 and/or the second side wrapping assembly 304. The longitudinal side wrapping assembly 300 may be configured to wrap the sheets of edge facing material 318, 322 from the first broad face 202 and onto the second broad face 204 of the cementitious panel material 134 prior to the upper sheet of facing material 124 being brought into position along the second broad face 204. As such, the sheets of facing material 318, 322 would underlap the upper sheet of facing material 124. This may include a first longitudinal edge of the first sheet of edge facing material 318 underlapping the first longitudinal edge of the upper sheet of facing material 124 on the second broad face 204, and/or a first longitudinal edge of the second sheet of edge facing material 322 underlapping the second longitudinal edge of the upper sheet of facing material 124 on the second broad face 204.

In another embodiment, the edge facing equipment 314 may be positioned so as to introduce the strips of edge facing material 318, 322 to the longitudinal side wrapping assembly 300 downstream from the parallel plates or rolls 306, 308, and the upper facing material supply assembly 122 may be configured to supply the upper sheet of facing material 124 to the conveyor assembly 132 upstream from the longitudinal side wrapping assembly 300, including the first side wrapping assembly 302 and/or the second side wrapping assembly 304. As such, the sheets of edge facing material 318, 322 would overlap the upper sheet of facing material 124. This may include the first longitudinal edge of the first sheet of edge facing material 318 overlapping the first longitudinal edge of the upper sheet of facing material 124 on the second broad face 204, and/or the first longitudinal edge of the second sheet of edge facing material 118 overlapping the second longitudinal edge of the upper sheet of facing material 124 on the second broad face 204.

The one or more adhesive applicators 128 may be configured to apply the radiation-curable adhesive to the sheets of edge facing material 318, 322. The one or more adhesive applicators may be configured and arranged in any desired orientation so as to adhere a first longitudinal edge of a sheet of edge facing material to a first longitudinal edge of the upper sheet of facing material, and so as to adhere a second longitudinal edge of the sheet of edge facing material to a first longitudinal edge of a lower sheet of facing material. In one embodiment, the radiation-curable adhesive is applied to the outward-facing underlapping surface of the sheets of edge facing material 318, 322 such that the radiation-curable adhesive may contact the lower sheet of facing material 118 when the sheets of edge facing material are brought into position along the first broad face 202 of the cementitious panel 134. Additionally, the radiation-curable adhesive applied to the sheets of edge facing material 318, 322, may contact the upper sheet of facing material 124 when the upper sheet of facing material 124 is brought into position along the second broad face 204 of the cementitious panel material 134. The one or more adhesive applicators 128 may include a first adhesive applicator configured to apply the radiation-curable adhesive to a first longitudinal edge of the first sheet of edge facing material 318, a second adhesive applicator configured to apply the radiation-curable adhesive to a second longitudinal edge of the first sheet of edge facing material 318, a third adhesive applicator configured to apply the radiation-curable adhesive to a first longitudinal edge of the second sheet of edge facing material 322, a fourth adhesive applicator configured to apply the radiation-curable adhesive to a second longitudinal edge of the second sheet of edge facing material 322. Alternatively, the one or more adhesive applicators 128 may be repositioned, or additional adhesive applicators 128 may be provided, so as to apply the radiation-curable adhesive to the underside of the upper sheet of facing material 124 such that the radiation-curable adhesive will contact the sheets of edge facing material 318, 322 underlapping the upper sheet of facing material 124, and/or so as to apply the radiation-curable adhesive to the inward side of the lower sheet of facing material 118 such that the radiation-curable adhesive will contact the sheets of edge facing material 318, 322 when brought into underlapping contact with the lower sheet of facing material 118. In this embodiment, the one or more adhesive applicators 128 may include a first adhesive applicator configured to apply the radiation-curable adhesive to the first longitudinal edge of the upper sheet of facing material 124, a second adhesive applicator configured to apply the radiation-curable adhesive to the second longitudinal edge of the upper sheet of facing material 124, a third adhesive applicator configured to apply the radiation-curable adhesive to the first longitudinal edge of the lower sheet of facing material 118, a fourth adhesive applicator configured to apply the radiation-curable adhesive to the second longitudinal edge of the lower sheet of facing material 118.

On the other hand, with the forming assembly 134 configured such that the sheets of edge facing material 318, 322 overlap the upper sheet of facing material 124 and/or the lower sheet of facing material 118, the adhesive applicators 128 should be positioned accordingly. For example, adhesive applicators 128 may be positioned so as to apply the radiation-curable adhesive to the underside of the sheets of edge facing material 318, 322 prior to the longitudinal side wrapping assembly 300 wrapping the sheets of edge facing material 318, 322 from the first broad face 202 and onto the second broad face 204 of the cementitious panel material 134, thereby overlapping the upper sheet of facing material 124 and/or the lower sheet of facing material 118. Alternatively, or in addition, adhesive applicators 128 may be positioned so as to apply the radiation-curable adhesive 130 to the outward-facing underlapping surface of the upper sheet of facing material 124 and/or the outward-facing underlapping surface of the lower sheet of facing material 118, such that the upper sheet of facing material and/or the lower sheet of facing material 118 will contact the adhesive when the longitudinal side wrapping assembly 300 wraps the sheets of edge facing material 318, 322 from the first broad face 202 and onto the second broad face 204 of the cementitious panel material 134.

When edge facing material is adhered to both the upper sheet of edge facing material and the lower sheet of edge facing material, the radiation-emitting devices 136 may be positioned in proximity to both the upper and lower longitudinal edges of the cementitious panel material 134. As shown in FIG. 3A, a first radiation-emitting device 310 and a second radiation-emitting device 312 are positioned on the upper side of the cementitious panel 134, in proximity to a first longitudinal edge and a second longitudinal edge thereof, respectively. Similarly, in addition or in the alternative, a third radiation-emitting device and a fourth radiation emitting device may be positioned on the lower side of the cementitious panel 134, in proximity to a first longitudinal edge and a second longitudinal edge thereof, respectively, such that the radiative beams from such devices are emitted in proximity to the portion of the cementitious panel material 134 where the radiation-curable adhesive has been applied.

Figure 4A:
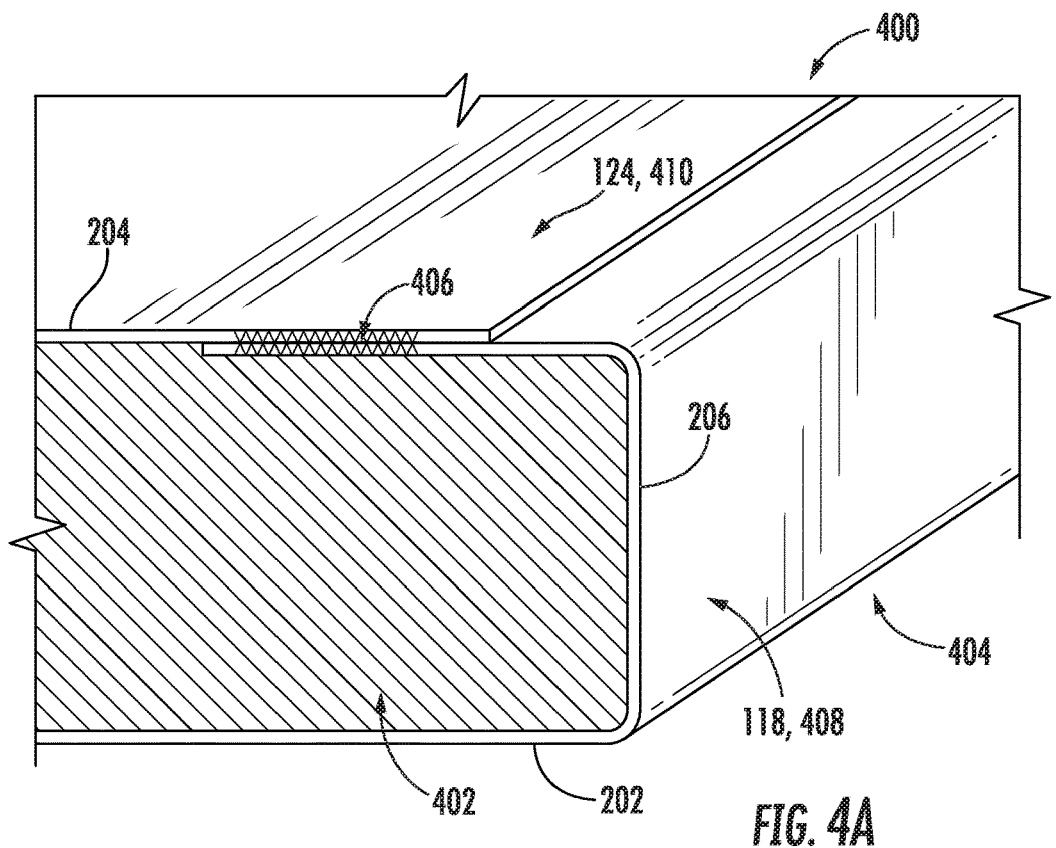
FIGS. 4A-4D show close-up lateral cross-sectional views of exemplary cementitious panels with which may be manufactured using the system shown in FIG. 1.
Figure 4B:
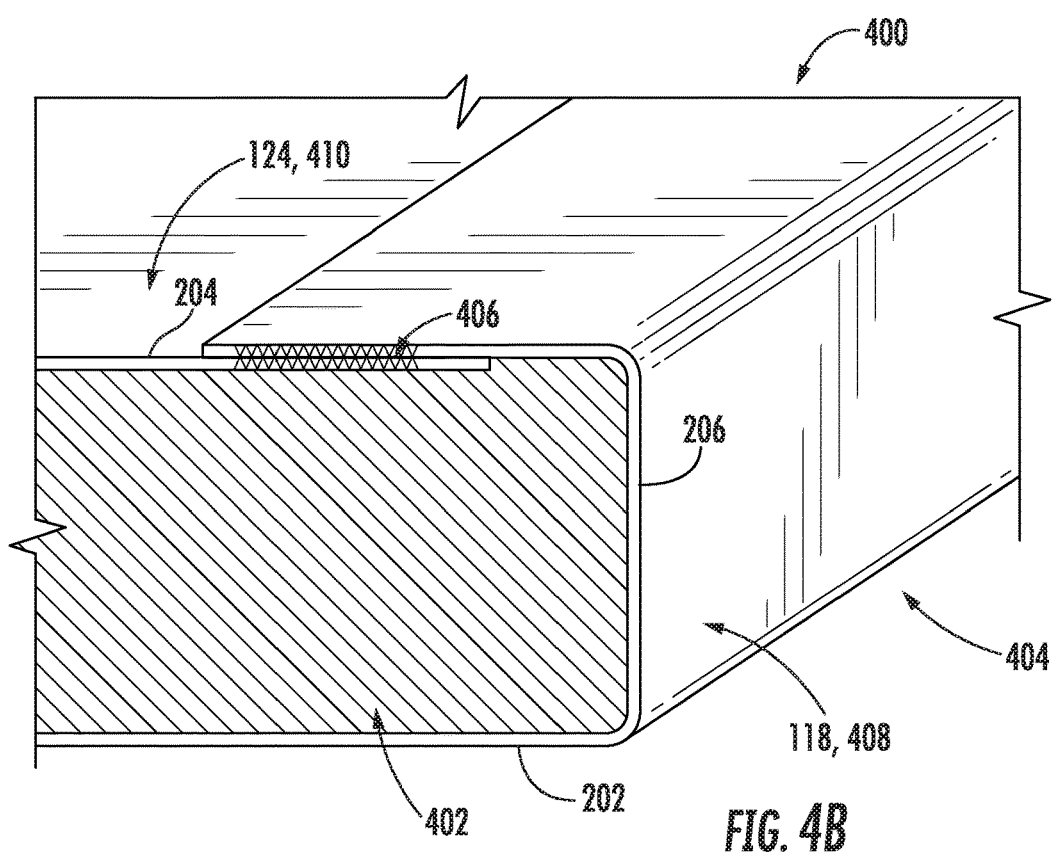
Figure 4C:
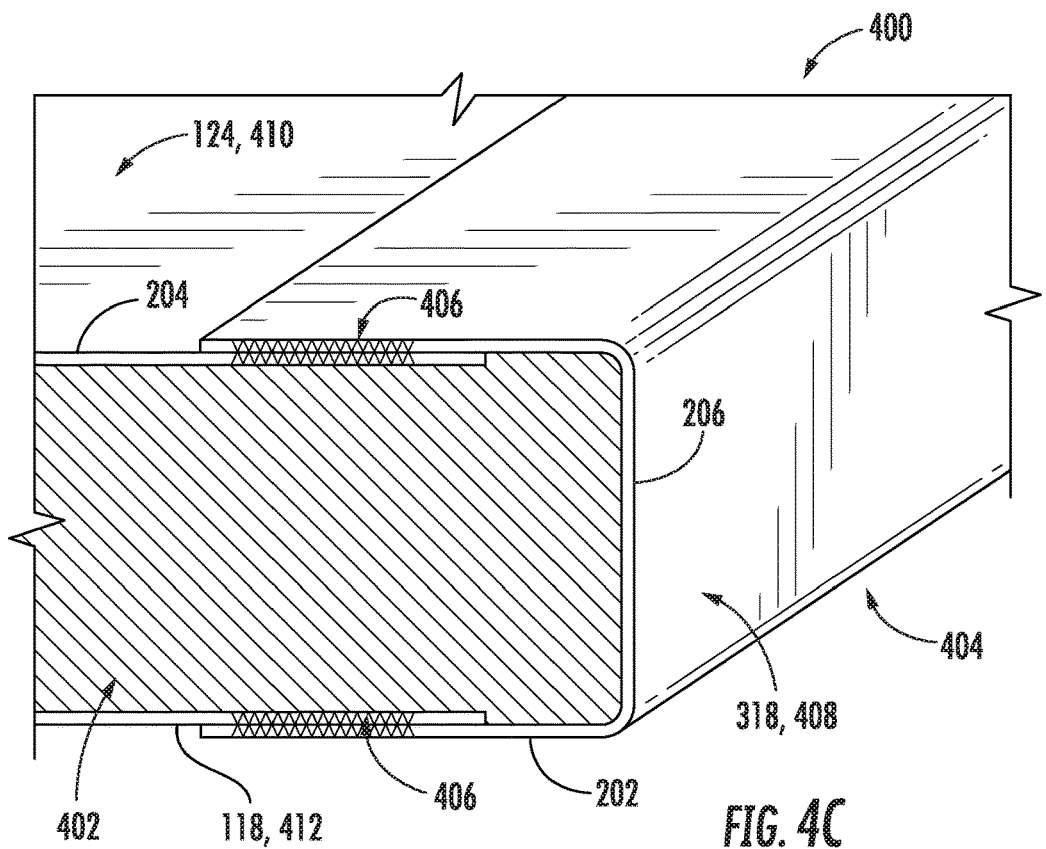
Figure 4D:
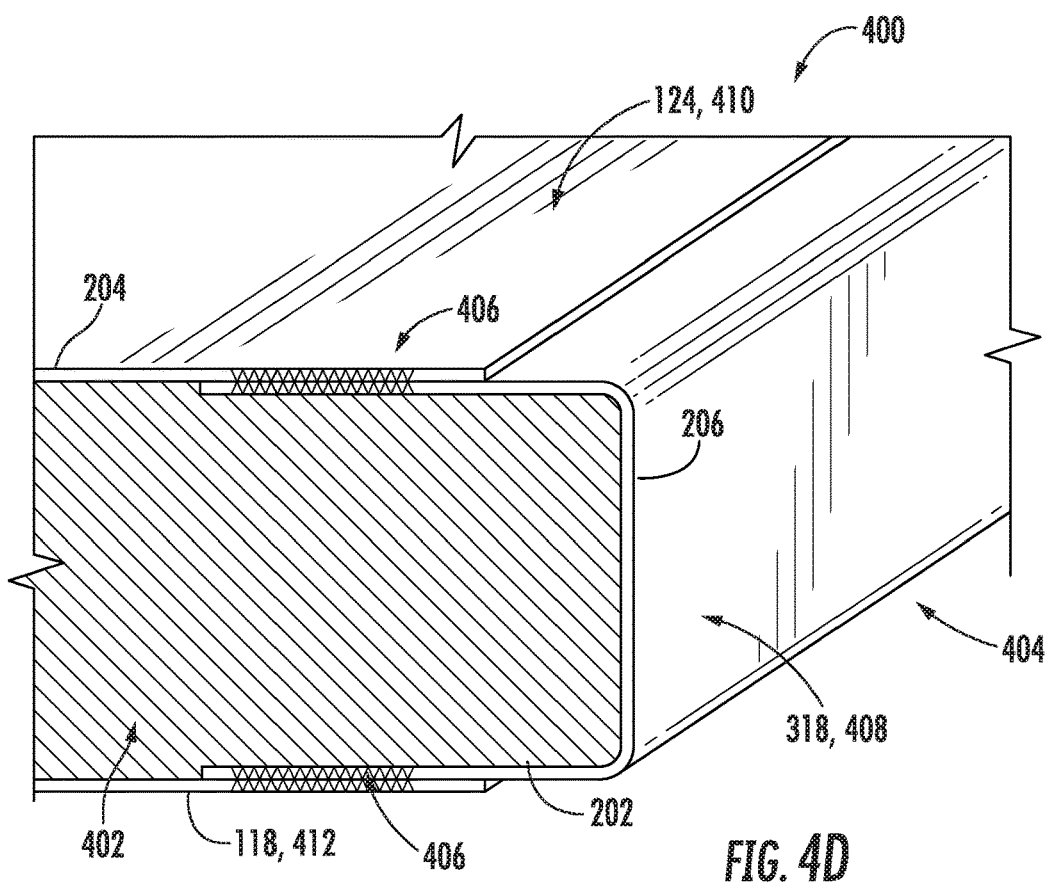

Now referring to FIGS. 4A-4D, close-up lateral cross-sectional views are shown of various embodiments of an exemplary cementitious panel 400, which may be manufactured using the exemplary system 100 described herein. As discussed above with respect to FIGS. 2A and 2B, the cementitious panel 200, 400 includes a first broad face 202, a second broad face 204, a first longitudinal side 206, and a second longitudinal side 208. An exemplary panel 400 includes a cementitious core material 402, a plurality of sheets of facing material 404 surrounding the cementitious core material 402, and a radiation-cured adhesive 406. As shown in FIGS. 4A and 4B, the cementitious panel 400 includes a lower sheet of facing material 118 and an upper sheet of facing material 124. As shown in FIGS. 4C and 4D, the cementitious panel 400 includes a lower sheet of facing material 118, an upper sheet of facing material 124, a first strip of edge facing material 318. Additionally, although not shown, it will be appreciated that the cementitious panel 400 in FIGS. 4C and 4D also include a second strip of edge facing material 322. One or more of the plurality of sheets of facing material 404 may be at least partly embedded in the cementitious core material 402.

As will be apparent by the context, the lower sheet of facing material 118 may sometimes be referred to as a "first" sheet of facing material, and the upper sheet of facing material 124 may sometimes be referred to as a "second" sheet of facing material. Similarly, equipment in the exemplary system 100 corresponding to the lower sheet of facing material 118 may sometimes be referred to with the term "first" and equipment in the exemplary system 100 corresponding to the upper sheet of facing material 124 may sometimes be referred to with the term "second." Alternatively, or in addition, when referring to edge facing material (as shown in FIGS. 4C and 4D) and corresponding equipment together with upper and lower strips of facing material, the terms "first", "second", "third", and "fourth" may sometimes be used in a clockwise manner, starting from the first edges strip 318. Following this clockwise order, the terms "first" and "third" may sometimes be used to refer to respective edge strips 318, 322 and equipment corresponding to such edge strips, and the terms "second" and "fourth" may sometimes be used to refer to the upper and lower sheets of facing material 118, 124 and corresponding equipment, respectively. Of course, these references will be apparent by the context, and the terms "first", "second", "third", and "fourth" may also be used in other ways, in each case without intending to signify importance.

As shown in FIGS. 4A-4D, The plurality of sheets of facing material 404 include a first sheet of facing material 408 and a second sheet of facing material 410. The radiation-cured adhesive 406 may be applied to the first sheet of facing material 408 and/or to the second sheet of facing material 410 so as to adhere the first sheet of facing material 408 to the second sheet of facing material 410. In some embodiments, the radiation-curable adhesive includes an adhesive that is curable with ultraviolet radiation or electron-beam radiation. Alternatively, or in addition, the radiation-curable adhesive may include an adhesive that is curable with infrared radiation.

The first sheet of facing material 408 wraps from the first broad face 202 and onto the second broad face 204 of the cementitious panel 400, thereby defining the first longitudinal side 206 of the cementitious panel. Similarly, the first sheet of facing material may wrap from the first broad face 202 and onto the second broad face 204 of the cementitious panel 400, thereby defining the second longitudinal side 208 of the cementitious panel. The second sheet of facing material 410 extends along the second broad face 204 of the cementitious panel 400. The first sheet of facing material 408 may underlap the second sheet of facing material 410 on the second broad face 204 (FIGS. 4A and 4D), or the first sheet of facing material 408 may overlap the second sheet of facing material 410 on the second broad face 204 (FIGS. 4B and 4C).

As shown in FIGS. 4A and 4B, the first sheet of facing material 408 extends across the width of the first broad face 202 of the cementitious panel 400. A first longitudinal edge of the first sheet of facing material 408 wraps around the first longitudinal side 206 and onto the second broad face 204 of the cementitious panel 400. As shown in FIGS. 4A and 4C, the first longitudinal edge of the first sheet of facing material 408 underlaps a first longitudinal edge of the second sheet of facing material 410 on the second broad face 204. As shown in FIGS. 4B and 4D, the first longitudinal edge of the first sheet of facing material 408 overlaps the first longitudinal edge of the second sheet of facing material 410 on the second broad face 204. Although not shown, it will be appreciated that in the embodiments shown in FIGS. 4A and 4B, a second longitudinal edge of the first sheet of facing material 408 may wrap around the second longitudinal side 208 and onto the second broad face 204 of the cementitious panel 400, and that the second longitudinal edge of the first sheet of facing material 408 underlap or overlap the second longitudinal edge of the second sheet of facing material 410 on the second broad face 204.

In the embodiment shown in FIGS. 4A and 4B, the radiation-cured adhesive 406 may be applied to the first longitudinal edge of the first sheet of facing material 408 and/or to the first longitudinal edge of the second sheet of facing material 410, so as to adhere the first longitudinal edge of the first sheet of facing material 408 to the first longitudinal edge of the second sheet of facing material 410. Similarly, in the embodiments shown in FIGS. 4A and 4B, the radiation-curable adhesive may be applied to the second longitudinal edge of the first sheet of facing material 408 and/or to the second longitudinal edge of the second sheet of facing material 410, so as to adhere the second longitudinal edge of the first sheet of facing material 408 to the second longitudinal edge of the second sheet of facing material 410.

As shown in FIGS. 4C and 4D, the first sheet of facing material 408 wraps from the first broad face 202 and onto the second broad face 204 of the cementitious panel 400, thereby defining the first longitudinal side 206 of the cementitious panel 400, and the second sheet of facing material 410 extends along the second broad face 204 of the cementitious panel 400. Additionally, a third sheet of facing material 322 (not shown in FIGS. 4C and 4D) wraps from the first broad face 202 and onto the second broad face 204 of the cementitious panel 400, thereby defining the second longitudinal side 208 (FIGS. 2A and 2B) of the cementitious panel 400. Also as shown in FIGS. 4C and 4D, a fourth sheet of facing material 412 extends along the first broad face 202 of the cementitious panel 400.

As shown in FIG. 4C, a first longitudinal edge of the first sheet of facing material 408 overlaps a first longitudinal edge of the second sheet of facing material 410 on the second broad face 204, and a second longitudinal edge of the first sheet of facing material 408 overlaps a first longitudinal edge of the fourth sheet of facing material 412 on the first broad face 202. Additionally, although not shown, it will be appreciated that in the embodiment shown in FIG. 4C, a first longitudinal edge of the third sheet of facing material 322 may overlap a second longitudinal edge of the second sheet of facing material 410 on the second broad face 204, and a second longitudinal edge of the third sheet of facing material 3222 may overlap a second longitudinal edge of the fourth sheet of facing material 412 on the first broad face 202.

As shown in FIG. 4D, a first longitudinal edge of the first sheet of facing material 408 underlaps a first longitudinal edge of the second sheet of facing material 410 on the second broad face 204, and a second longitudinal edge of the first sheet of facing material 408 underlaps a first longitudinal edge of the fourth sheet of facing material 412 on the first broad face 202. Additionally, although not shown, it will be appreciated that in the embodiment shown in FIG. 4D, a first longitudinal edge of the third sheet of facing material 322 may underlap a second longitudinal edge of the second sheet of facing material 410 on the second broad face 204, and a second longitudinal edge of the third sheet of facing material 3222 may underlap a second longitudinal edge of the fourth sheet of facing material 412 on the first broad face 202.

In the embodiment shown in FIGS. 4C and 4D, the radiation-cured adhesive 406 may be applied to the first longitudinal edge of the first sheet of facing material 408 and/or to the first longitudinal edge of the second sheet of facing material 410, so as to adhere the first longitudinal edge of the first sheet of facing material 408 to the first longitudinal edge of the second sheet of facing material 410. Additionally, the radiation-curable adhesive may be applied to the second longitudinal edge of the first sheet of facing material 408 and/or the first longitudinal edge of the fourth sheet of facing material 412, so as to adhere the second longitudinal edge of the first sheet of facing material 408 to the first longitudinal edge of the fourth sheet of facing material 412. The radiation-curable adhesive also may be applied to the first longitudinal edge of the third sheet of facing material 322 and/or the second longitudinal edge of the second sheet of facing material 410, so as to adhere the first longitudinal edge of the third sheet of facing material 322 to the second longitudinal edge of the second sheet of facing material 410. Further, the radiation-curable adhesive also may be applied to the second longitudinal edge of the third sheet of facing material 322 and/or the second longitudinal edge of the fourth sheet of facing material 412, so as to adhere the second longitudinal edge of the third sheet of facing material 322 to the second longitudinal edge of the fourth sheet of facing material 412.

Figure 5:
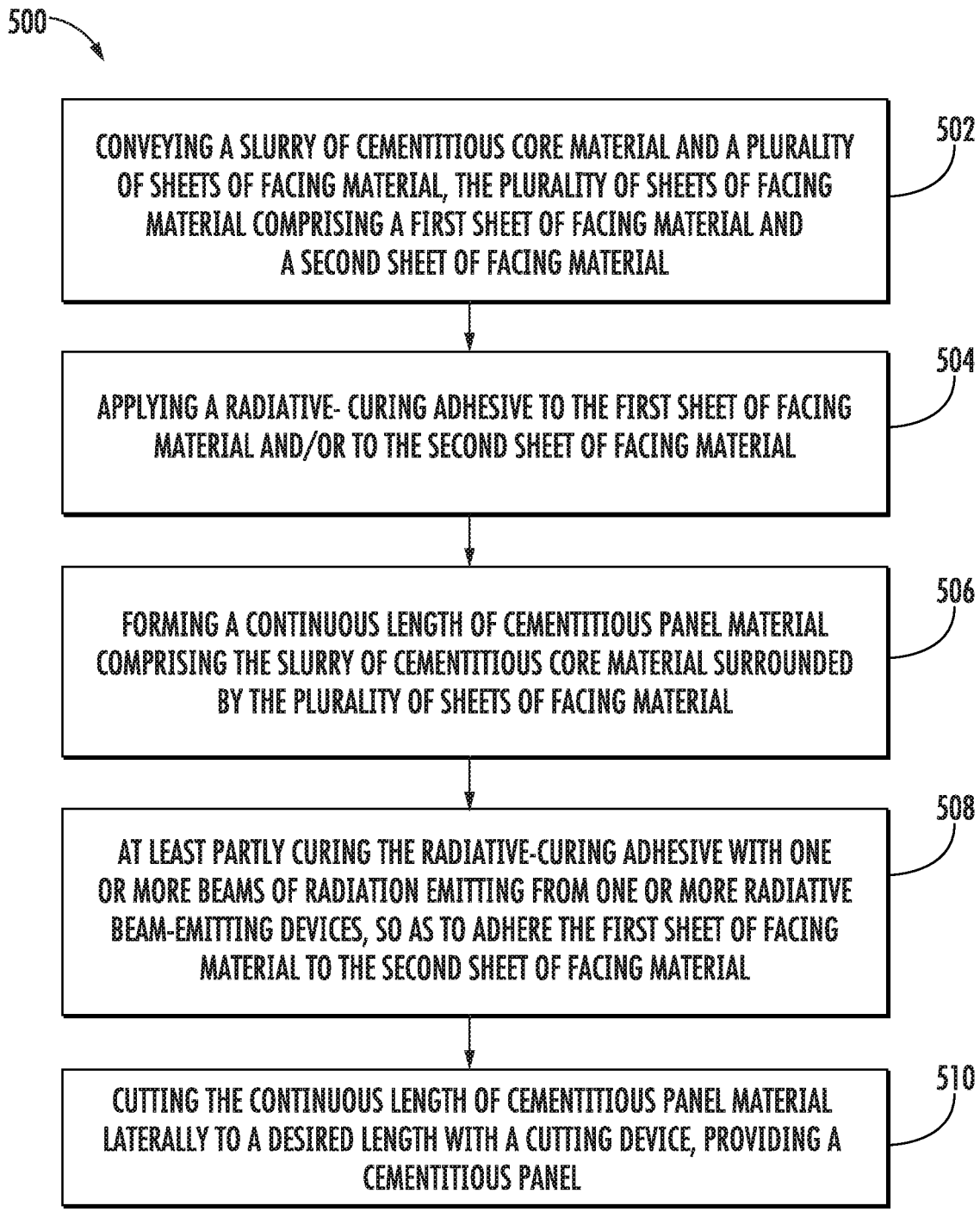
FIG. 5 shows a flowchart depicting an exemplary method of manufacturing a cementitious panel.

Now turning to FIG. 5, exemplary methods of manufacturing cementitious panels will now be discussed. Exemplary methods may be performed using the exemplary system 100 described herein, including any combination or arrangement of various features of such systems. Additionally, exemplary methods may be performed to make any of the cementitious panels described herein, including any combination or arrangement of various features of such panels.

An exemplary method 500 includes conveying with a conveyor assembly, a slurry of cementitious core material and a plurality of sheets of facing material 502. The plurality of sheets of facing material include a first sheet of facing material and a second sheet of facing material. The exemplary method 500 proceeds by applying with one or more adhesive applicators, a radiation-curable adhesive to the first sheet of facing material and/or to the second sheet of facing material 504, and forming with a forming assembly, a continuous length of cementitious panel material comprising the slurry of cementitious core material surrounded by the plurality of sheets of facing material 506. The cementitious panel material includes a first broad face, a second broad face, a first longitudinal side, and a second longitudinal side. The exemplary method 500 continues with at least partly curing the radiation-curable adhesive with one or more beams of radiation emitting from one or more radiative beam-emitting devices, so as to adhere the first sheet of facing material to the second sheet of facing material 508, and then cutting the continuous length of cementitious panel material laterally to a desired length with a cutting device 510.

Because the radiation-curable adhesive is cured on the production line, buildup of adhesive material on the manufacturing equipment and associated defects in the gypsum board are reduced, as is the need for downtime and clean up. The cured adhesive also strengthens the longitudinal edges of the cementitious panels to resist cracking during cutting and transfer operations.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cementitious panel, comprising:
a cementitious core material;
a plurality of sheets of facing material surrounding the cementitious core material, the plurality of sheets of facing material comprising a first sheet of facing material and a second sheet of facing material; and
a radiation-cured adhesive applied to the first sheet of facing material and/or to the second sheet of facing material so as to adhere the first sheet of facing material to the second sheet of facing material.

2. The cementitious panel of claim 1, wherein the radiation-cured adhesive comprises an adhesive that is cured with ultraviolet radiation.

3. The cementitious panel of claim 1, wherein the radiation-cured adhesive comprises an adhesive that is cured with infrared radiation.

4. The cementitious panel of claim 1, wherein the radiation-cured adhesive comprises an adhesive that is cured with electron-beam radiation.

5. The cementitious panel of claim 1, wherein the radiation-cured adhesive comprises an epoxide, a urethane, a polyether, a polyester, an epoxy resin, a styrene, an acrylate, a vinyl ether, a lactone, a lactam, a cyclic ether, a cyclic acetyl, a cyclic siloxane, N-Vinylpyrrolidone, and/or N-vinylcarbazole.

6. The cementitious panel of claim 1, wherein the radiation-cured adhesive is in the form of an intermittent pattern of ribbons, beads, lines, dots, or spots.

7. The cementitious panel of claim 1, wherein the cementitious core material comprises a hydraulically setting material.

8. The cementitious panel of claim 1, wherein the cementitious core material comprises gypsum and/or cement.

9. The cementitious panel of claim 1, wherein at least one of the plurality of sheets of facing material is at least partly embedded in the cementitious core material.

10. The cementitious panel of claim 1, wherein at least one of the plurality of sheets of facing material comprises one or more layers of woven or non-woven fibers or filaments.

11. The cementitious panel of claim 10, wherein the fibers or filaments comprise a thermoplastic material, a thermoset material, and/or a glass material.

12. The cementitious panel of claim 1, wherein at least one of the plurality of sheets of facing material comprises a paper or paperboard material.

13. A method of manufacturing a cementitious panel, the method comprising:
conveying a slurry of cementitious core material and a plurality of sheets of facing material, the plurality of sheets of facing material comprising a first sheet of facing material and a second sheet of facing material;
applying a radiation-curable adhesive to the first sheet of facing material and/or to the second sheet of facing material;
forming a continuous length of cementitious panel material comprising the slurry of cementitious core material surrounded by the plurality of sheets of facing material;
at least partly curing the radiation-curable adhesive with one or more beams of radiation emitting from one or more radiation-emitting devices, so as to adhere the first sheet of facing material to the second sheet of facing material; and
cutting the continuous length of cementitious panel material laterally to a desired length, providing a cementitious panel.

14. The method of claim 1, wherein the radiation-curable adhesive comprises an epoxide, a urethane, a polyether, a polyester, an epoxy resin, a styrene, an acrylate, a vinyl ether, a lactone, a lactam, a cyclic ether, a cyclic acetyl, a cyclic siloxane, N-Vinylpyrrolidone, and/or N-vinylcarbazole.

15. The method of claim 13, wherein the radiation-curable adhesive comprises an ionic initiator and/or a free radical initiator.

16. The method of claim 13, wherein the radiation-curable adhesive has substantially cured prior to cutting the continuous length of cementitious panel material.

17. The cementitious panel of claim 1, comprising applying the radiation-curable adhesive to the first sheet of facing material and/or to the second sheet of facing material in the form of an intermittent pattern of ribbons, beads, lines, dots, or spots.

18. The method of claim 13, comprising turning the cementitious panel over at a wet transfer table comprising an articulating lifting and lowering mechanism, wherein the radiation-curable adhesive has substantially cured prior to turning the cementitious panel over.

19. The method of claim 13, wherein the radiation-curable adhesive comprises an adhesive that is curable with ultraviolet radiation, and wherein the one or more radiation-emitting devices comprise an ultraviolet radiation-emitting device.

20. The method of claim 13, wherein the radiation-curable adhesive comprises an adhesive that is curable with infrared radiation, and wherein the one or more radiation-emitting devices comprise an infrared radiation-emitting device.

21. The method of claim 13, wherein the radiation-curable adhesive comprises an adhesive that is curable with electron-beam radiation, and wherein the one or more radiation-emitting devices comprise an electron-beam emitting device.

22. The method of claim 13, wherein the cementitious core material comprises a hydraulically setting material.

23. The method of claim 13, wherein the cementitious core material comprises gypsum and/or cement.

* * * * *